United States Patent [19]

Peleties

[11] Patent Number: 5,638,770
[45] Date of Patent: Jun. 17, 1997

[54] PET LITTER MATERIAL

[75] Inventor: Christodoulos Philippou Peleties, Nicosia-Cyrus, Cyprus

[73] Assignee: Peletico Limited, Nicosia, Cyprus

[21] Appl. No.: 507,822

[22] Filed: Jul. 27, 1995

[30] Foreign Application Priority Data

Aug. 3, 1994 [GB] United Kingdom ............... 9415695

[51] Int. Cl.⁶ .................................................. A01K 1/015
[52] U.S. Cl. ................................................................ 119/173
[58] Field of Search ........................................ 119/171, 173

[56] References Cited

U.S. PATENT DOCUMENTS

| 3,286,691 | 11/1966 | McFadden | 119/173 |
| 3,425,397 | 2/1969 | Schulein | 119/171 |
| 4,187,803 | 2/1980 | Valenta | 119/171 X |
| 5,207,830 | 5/1993 | Cowan et al. | 119/171 X |
| 5,303,676 | 4/1994 | Lawson | 119/173 |
| 5,317,990 | 6/1994 | Hughes | 119/171 |
| 5,421,291 | 6/1995 | Lawson et al. | 119/173 |

*Primary Examiner*—Robert P. Swiatek
*Assistant Examiner*—Elizabeth Shaw
*Attorney, Agent, or Firm*—Iandiorio & Teska

[57] ABSTRACT

A pet litter material comprising a mixture of bentonite clay and expanded perlite, the mixture having a bulk density of from 650–950 Kg/cubic metre. The bentonite clay may be calcium bentonite clay, sodium exchanged bentonite clay, or a mixture of both of these types of clay. A method of producing the pet litter material is also described.

9 Claims, No Drawings

PET LITTER MATERIAL

This invention relates to a pet litter material, to a method of producing the pet litter material, and to a litter container when containing the pet litter material.

Pet litter material is widely used for pets such for example as cats, dogs, gerbils, guinea pigs, mice, hampsters, rabbits and ferrets. Traditional pet litter materials are straw, sawdust, wood chips, wood shavings, shredded paper and sand. Such traditional pet litter materials are cheap to purchase but they all start to smell after a short period of use. It is then necessary to remove all of the pet litter material and replace it with fresh pet litter material. Where pets are kept indoors, the pet litter material will usually need completely changing at least every other day in order to avoid objectionable odours and/or wet pet litter material sticking to the pet and possibly causing discomfort and/or infection for the pet.

In order to overcome the disadvantages of the above mentioned traditional pet litter materials, it is known to use a bentonite clay such as calcium bentonite clay or sodium bentonite clay. The bentonite clay is in the form of granules which are able to absorb urine and other liquids. Still further, when the bentonite clay granules are wetted, they stick together to form a lump of material. This lump of material can be removed from the remainder of the pet litter material, thereby removing the source of odour and possibly also irritation and/or infection, whilst at the same time avoiding the need to replace the entire pet litter material. Thus the bentonite clay is able to reduce odours from soiled litter material, whilst being economical to use and also whilst avoiding the need for pet owners to clean their pet litter containers as frequently as they previously had to do when using the traditional pet litter materials. Still further, due to the ability of the bentonite clay to absorb liquids and stick together, the soiled bentonite clay tends not to stick to the pets and thus increases their comfort whilst at the same time reducing the chances of infection.

It will thus be seen that the use of a bentonite clay as a pet litter material represents a substantial advantage over the traditional pet litter materials. However, the bentonite clay material is relatively expensive when compared with the traditional pet litter materials and some pet owners are unable to afford the known bentonite clay pet litter material. It is an aim of the present invention to reduce this problem.

Accordingly, in one non-limiting embodiment of the present invention there is provided a pet litter material comprising a mixture of bentonite clay and expanded perlite, the mixture having a bulk density of from 650–950 Kg/cubic metre.

Usually, the bentonite clay has a normal bulk density of 1000–1070 Kg/cubic metre and the perlite has a bulk density of 80–120 Kg/cubic metre and more usually 80–100 Kg/cubic metre. By varying the amount of bentonite clay and expanded perlite in the mixture, the mixture can be arranged to have a bulk density of 650–950 Kg/cubic metre, which bulk density has been found to be advantageous for the pet litter material, both in terms of cost effectiveness and efficiency of use.

Preferably, the bentonite clay is calcium bentonite clay. The bentonite clay may however be sodium exchanged bentonite clay or a mixture of both types of clay.

The pet litter material may include one or more of perfumes, deodorants, odour absorbents, anti-microbial agents, disinfectants, pesticides and colourants.

In another non-limiting embodiment of the invention, there is provided a method of producing a pet litter material, which method comprises providing a bentonite clay having a bulk density of from 1000–1070 Kg/cubic metre, providing perlite, expanding the perlite by heating until the perlite has a bulk density of 80–120 Kg/cubic metre, mixing together the bentonite clay, the expanded perlite and water to form a wet mass having a moisture content of 18–35% by weight, feeding the wet mass under pressure through an extruder to produce small stick members having a diameter of 8–20 mm, drying the stick members until they have a moisture content of from 5–12% by weight, allowing the dried stick members to cool, and then crushing and screening the stick members into granules.

The bentonite clay may be obtained by excavating the bentonite clay, crushing the bentonite clay into small particles, and separating stones and other foreign matter.

The bentonite clay used in the method of the invention is preferably calcium bentonite clay but it may be sodium exchanged bentonite clay or a mixture of both clays.

The wet mass preferably has a moisture content of 20–30% by weight, and the wet mass is preferably fed through the extruder under a pressure of 15–30 bars.

The stick members may be dried by being passed through a dryer.

Preferably, the granules are screened into granules of 0.5–7 mm size, 0.5–5 mm size and 0.5–2 mm size.

In order to facilitate a full and complete understanding of the present invention, reference will now be made to the following Example.

EXAMPLE

Natural calcium bentonite clay was excavated, crushed into small particles, and stones and other foreign matter were separated from the small particles. Fine particles of perlite ore were expanded in a furnace until the perlite particles had a bulk density of 80–120 Kg cubic metre.

The calcium bentonite clay and the expanded perlite were fed through two separate feeders into a trough mixer, whilst adding water to create a wet mass having a moisture content 20–30% by weight. The wet mass was then fed into an extruder under a pressure of 20–25 bars. The extruded mass was in the form of macaroni sticks having a diameter of 8–20 mm.

The macaroni sticks were passed through a dryer to reduce the moisture content of the macaroni sticks down to 5–12% by weight. The dried macaroni sticks were then piled up and left to cool. The cooled macaroni sticks were then crushed and screened to granules of the following sizes:

0.5–7 mm
0.5–5 mm
0.5–2 mm

The obtained pet litter material was placed in a litter container in the form of a plastics tray. The pet litter material was placed to a height of 50–70 mm. A number of household pets including pets, puppies and hampsters were allowed to urinate and defecate on to the litter material. The litter material absorbed the wet matter instantly and formed itself into lumps which were able to be removed periodically and disposed by being thrown into a refuse bin. It was found that even after wetting, the individual granules of the litter material stayed hard and maintained their original shape. The lumps of wetted litter material were generally spherical and solid and they were easy to obtain when the plastic tray was shaken. When the lumps of soiled litter material were removed, the remaining litter material in the plastic tray was found to be clean and un-soiled. Unpleasant odours thus did not build up and the plastic tray was refilled as necessary with fresh litter material. It was found that the plastic tray could be left for periods as long as two weeks before needing to be completely emptied, cleaned and refilled with fresh litter material.

It is to be appreciated that the embodiment of the invention described above with reference to the Example has been given for illustrative purposes only and that modifications may be effected. The pet litter material of the present invention is economical in use and is especially useful for persons keeping pets in flats where it is difficult to dispose of the large amounts of pet litter material. Still further, as indicated above, the pet litter material of the present invention is more economical to purchase than the known bentonite clay pet litter material. This is because the pet litter material of the present invention has a lighter bulk density than the known bentonite clay pet litter material. For example, 1 Kg of the known bentonite clay pet litter material gives a bulk density of little less than 1 litre per Kg. In constrast 950 Kg/cm pet litter material of the present invention gives a bulk density of 1.12 litres per Kg, and 650 Kg/cm pet litter material gives a bulk density of 1.64 litres per Kg. Thus a person buying pet litter material per kilo buys more per kilo with the pet litter material of the present invention than with the known bentonite clay pet litter material. Also, the pet litter material of the present invention operates as efficiently as the known bentonite clay pet litter material, and it has the characteristic of being a lightweight clumping material.

I claim:

1. A method of producing a pet litter material, which method comprises providing a bentonite clay having a bulk density of from 1000–1070 K/cubic metre, providing perlite, expanding the perlite by heating until the perlite has a bulk density of 80–120 Kg/cubic metre, mixing together the bentonite clay, the expanded perlite and water to form a wet mass having a moisture content of 18–35% by weight, feeding the wet mass under pressure through an extruder to produce small stick members having a diameter of 8–20 mm, drying the stick members until they have a moisture content of 5–12% by weight, allowing the dried stick members to cool, and then crushing and screening the stick members into granules.

2. A method according to claim 1 in which the bentonite clay is obtained by excavating the bentonite clay, crushing the bentonite clay into small particles, and separating stones and other foreign matter.

3. A method according to claim 2 in which the bentonite clay is selected from the group consisting of calcium bentonite clay, sodum exchanged bentonite clay, and a mixture of calcium bentonite clay and sodium exchanged bentonite clay.

4. A method according to claim 3 in which the wet mass is fed through the extruder under a pressure of 15–30 bars.

5. A method according to claim 4 in which the stick members are dried by being passed through a dryer.

6. A method according to claim 5 in which the granules are screened into the sizes of 0.5–7 mm, 0.5–5 mm, and 0.5–2 mm.

7. A pet litter material comprising a mixture of bentonite clay and expanded perlite, the mixture having a bulk density which is 650–950 Kg/cubic metre and which is less than the bulk density of the bentonite clay on its own, and the mixture being such that it is only the expanded perlite which causes the mixture to have the bulk density which is less than the bulk density of the bentonite clay on its own.

8. A pet litter material according to claim 7 in which the bentonite clay is selected from the group consiting of calcium bentonite clay, sodium exchanged bentonite clay, and a mixture of calcium bentonite clay and sodium exchanged bentonite clay.

9. A pet litter material according to claim 7 and including one or more of perfumes, deodorants, odour absorbents, anti-microbial agents, disinfectants, pesticides and colourants.

* * * * *